United States Patent [19]

Domke et al.

[11] E Patent Number: Re. 32,018

[45] Reissued Date of Patent: Nov. 5, 1985

[54] METHOD OF PRODUCING SEALED PACKAGING CONTAINERS

[75] Inventors: Klaus Domke; Walter Saur, both of Ditzingen, Fed. Rep. of Germany

[73] Assignee: Robert Bosch GmbH, Stuttgart, Fed. Rep. of Germany

[21] Appl. No.: 356,160

[22] Filed: Mar. 8, 1982

Related U.S. Patent Documents

Reissue of:

[64] Patent No.: 4,290,253
Issued: Sep. 22, 1981
Appl. No.: 104,898
Filed: Dec. 18, 1979

[30] Foreign Application Priority Data

Dec. 23, 1978 [DE] Fed. Rep. of Germany ..... 2856021

[51] Int. Cl.[4] ..... B65B 51/02; B65B 1/28; B65B 3/18

[52] U.S. Cl. ..... 53/480; 53/410; 53/456; 53/469; 53/403; 53/404; 493/213; 493/220

[58] Field of Search ..... 53/128, 469, 129, 410, 53/480, 456, 404, 383, 371, 452, 403, 405; 98/115 R; 493/189, 213, 220; 383/103, 45; 156/145, 252, 253, 69

[56] References Cited

U.S. PATENT DOCUMENTS

| | | | |
|---|---|---|---|
| 2,092,445 | 9/1937 | Doulgheridis | 53/404 |
| 2,927,722 | 3/1960 | Metzger | 383/103 X |
| 2,946,502 | 7/1960 | Metzger | 383/103 X |
| 3,085,705 | 4/1963 | Varney . | |
| 3,191,360 | 6/1965 | Meissner et al. | 53/383 |
| 3,302,859 | 2/1967 | Perry | 383/103 |
| 3,432,087 | 3/1969 | Costello | 383/103 |
| 3,442,061 | 5/1969 | Grafingholt | 53/433 |
| 3,530,773 | 9/1970 | Kühnle et al. | 493/189 |
| 3,555,778 | 1/1971 | Kapare | 53/371 |
| 3,989,182 | 11/1976 | Stearley | 383/45 |
| 4,000,846 | 1/1977 | Gilbert | 383/103 |
| 4,066,067 | 1/1978 | Micheli | 128/2 F |
| 4,070,249 | 1/1978 | Janin et al. | 195/127 |
| 4,204,606 | 5/1980 | Micheli | 215/307 |

FOREIGN PATENT DOCUMENTS

| | | | |
|---|---|---|---|
| 7106198 | 2/1971 | Fed. Rep. of Germany . | |
| 1527058 | 5/1968 | France . | |
| 1583447 | 10/1969 | France . | |
| WO80/01047 | 5/1980 | PCT Int'l Appl. . | |
| 819758 | 9/1959 | United Kingdom . | |
| 917300 | 1/1963 | United Kingdom . | |
| 1064422 | 4/1967 | United Kingdom | 53/436 |

*Primary Examiner*—Horace M. Culver
*Attorney, Agent, or Firm*—Michael J. Striker

[57] ABSTRACT

Method of manufacturing a filled packaging container comprising the steps of forming a bag on a mandrel, connecting a seam provided in a formed bag, forming a hole on an upper side of the bag and inserting a valve into the hole to provide an air pressure release after filling the container with a material. Two opposite edges of the valve are formed with two flexible portions made of foil. A sealing fluid is applied in the channel to provide a fluid film to connect the foil portions.

6 Claims, 3 Drawing Figures

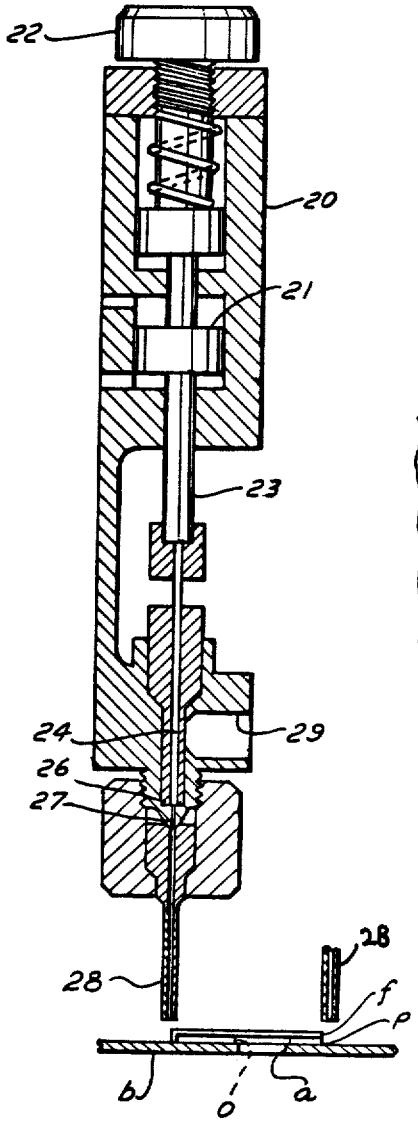
FIG. 2
FIG. 3
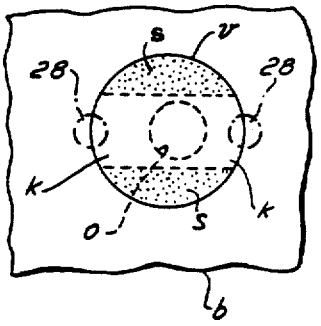

METHOD OF PRODUCING SEALED PACKAGING CONTAINERS

Matter enclosed in heavy brackets [ ] appears in the original patent but forms no part of this reissue specification; matter printed in italics indicates the additions made by reissue.

BACKGROUND OF THE INVENTION

This invention relates to methods of manufacturing packaging containers having a hollow body which is adapted to contain the commodity.

The known method of manufacturing packaging containers equipped with valves is described, as for example, in the French Pat. No. 1300753. This method of producing a packaging bag comprises a step of connecting two superimposed coextensive members formed of a plastic foil by welding the edges of two members in connection with a channel formed therebetween. In order to seal this channel a moisture fluid is applied onto the limited area of the boundaries of the foil surfaces before the welding of the foil members. This flowing fluid does not provide a uniform layer on the surface of the members and prevents the formation of channels of predetermined dimension sizes and smooth surfaces.

SUMMARY OF THE INVENTION

It is an object of the present invention to provide an improved sealing of the valve channels with high precision.

Another object of this invention is to provide a dosage of fluid sealing means applied onto the members to be sealed so that the applied fluid is distributed through the whole valve channel by a capillar effect.

An essential advantage of this invention has been found in that the sealing means may be applied any time independently of the making of the valves. For example, when a valve is manufactured and stored for a period of time, the channel formed between its two foil portions is later—when the valve is to be actually used—sealed by applying a seal fluid thereinto, so that no evaporation of the seal fluid occurs during the storage of the valve.

It has been found advantageous to use a silicone oil as a fluid seal.

BRIEF DESCRIPTION OF THE DRAWINGS

FIG. 2 is a section view of an arrangement for applying a sealing fluid on a valve-equipped bag; and FIG. 3 is a partial plan view of a valve-equipped container.

DETAILED DESCRIPTION OF THE INVENTION

Figure 1:
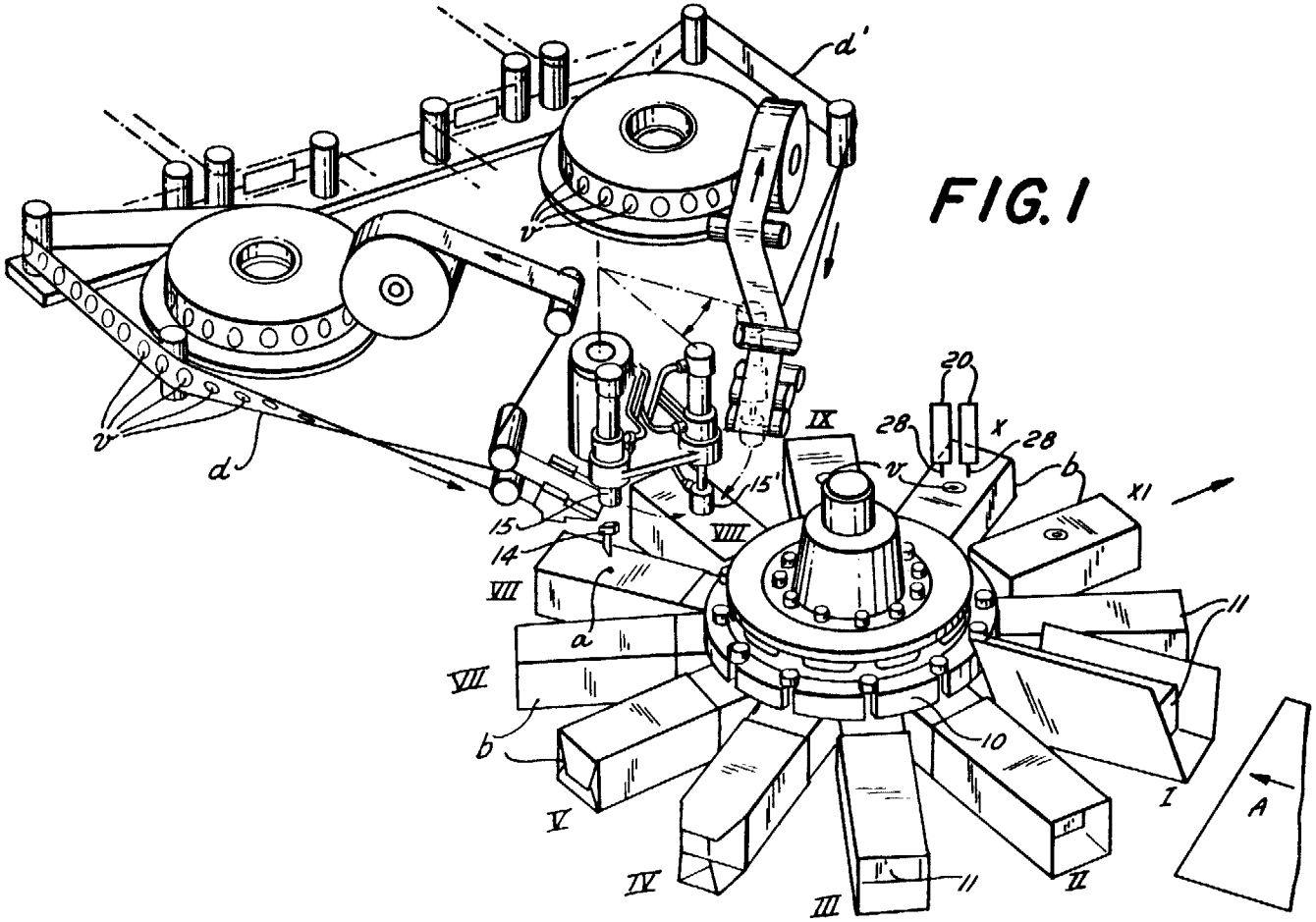
FIG. 1 is a generally diagrammatic perspective view of the packaging machine where a method of producing containers in accordance with the invention is utilized.

The material intended to form a packaging container or a bag package is directed to a packaging machine normally including a central support wheel 10 and a plurality of forming mandrels 11 radially outwardly extending from the wheel 10, which drives the mandrels step-wise in a predetermined sequence. The forming of the packaging container is performed at different positions around the support wheel. At a first position 1, as can be seen in FIG. 1, a flexible sheet of packaging material is placed around a first mandrel and shaped thereon into a sleeve of a rectangular shape. At the stations II–VI a further shaping of the bag is provided for forming a bottom seal of the bag "b". After removing the bag "b" from the mandrel 11 at the station XI it is filled with commodity, as for example coffee, and then it is sealed. A packaging machine of the type described above has been disclosed in the U.S. Pat. Nos. 3,442,061 and 3,530,773.

A tube like check valve which may be attached to a container is disclosed, as for example, in the U.S. Pat. No. 2,946,502. The bag package produced by the subject method is similar to that described in the above-mentioned patent. The bag is equipped with a valve consisting of two superimposed members connected to each other to provide a valve channel therebetween. Because such a valve channel is not thoroughly tight, a liquid or a fluid has been inserted into the channel. According to the invention the fluid is applied into the channel after the valve members are assembled and connected to each other.

Such a check valve is normally utilized in a hermetically sealed packaging container for releasing gases generated by the product packaged in the container and for excluding atmospheric air from penetrating into the container.

The tube like valve "v" connected to the body of the packaging container, for example a bag "b" includes, as can be seen in FIGS. 2 and 3, a relatively thick base "p" and a superposed thin flexible member "f". The base "p" is provided with an opening "o", which is in registering relation with a hole "a" punched in the wall of the bag "b". The lower side of the base "p" which rests on the top surface of the bag "b" is covered by a pressure sensitive adhesive material. Also an adhesive material is provided on the upper side of the base "p" in the form of two sectors "s" which bind the flexible member "f" to the base "p" providing a channel "K" therebetween which communicates with the opening "o" in the base "p".

Such a prefabricated valve "v" is attached at station VIII to the upper side of the bag "b" its opening "o" registering with the hole "a" which has been stamped into the bag wall by a pin 13 connected to a electromagnet 14 at station VII. Valves "v" are delivered sucessively to the station VIII by two suction devices 15, 15', which seize the valves "v" alternately from supply strips "d" and "d'", where the valves "v" adhere by the adhesive material at the lower side of their base "p". Under pressure and with the adhesive material provided the valve "v" becomes firmly attached to the body of the bag "b".

After attaching the valve "v" to the empty bag "b" and before filling and closing the bag package the valve "v" is sealed by applying a seal fluid into its channel "K". This is achieved by applying small drops of seal fluid onto the boundaries of the valve "v" at the ends of the channel "K". For this purpose the bag forming device at the position X is equipped with two dosage arrangements, as for example apparatus of series KMT 1000 of Firma Hilger and Kern GmbH in Mannheim, Germany. Such dosage arrangement shown in FIG. 2 includes a housing 20 with a pneumatically movable plunger 21 having a hub with a bolt 22 to limit the reciprocating movement of the plunger. Plunger 21 is provided with a plunger bar 23 connected to a needle 24 arranged with a seat 26. Seat 26 has a bore 27 carrying a tube 28 for the sealing fluid. Dimensions of the needle 24, and tubes 28 are such that small drops of flowing sealing fluid are provided through tubes 28 onto the boundaries of the valve "v". The two small dosage arrangements are mounted above the forming mandrel 11 at the position X so that the ends of the tubes 28 are located at both dosage positions above two opposite ends of the channel "K" of the valve "v" attached to the bag "b" as shown in FIGS. 2 and 3. Each dosage arrangement provides a small drop of the sealing fluid along each end of the channel "K" of the valve "v". The large portion of each fluid drop will penetrate into the channel "K" and the channel will be filled up by capillary attraction.

For filling the channel area a silicone oil may be applied in a small quantity. The silicone oil may be applied not only by dropping through a nozzle but also by a brush or by a twisted cord. The superfluous fluid applied onto the edges of the valve may be evaporated or otherwise removed. The sealing fluid applied to the valve channel fills up the tiny cavities between the corns in the surfaces of the valve members and seal the channel to prevent penetration into the packaging container of air from the atmosphere. But the expansion of gases within the packaging container will lift the flexible member portion of the valve so that the silicone film may be broken so that reduction of pressure within the container may be achieved through escaping of gas out of the container through the valve. After pressure reduction the fluid film closes again and fulfills the valve channel.

The described method may be utilized in connection with packaging of roasted coffee. Coffee in the presence of a neutral gas air is filled in the package which is thereafter hermetically sealed. The gases produced in the container after the sealing operation may escape from the bag through the assembled valve.

It will be understood that each of the steps described above, or two or more together, may also find a useful application in other types of methods differing from the types described above.

While the invention has been illustrated and described as embodied in a process for producing a valve-equipped packaging container, it is not intended to be limited to the details shown, since various modifications may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and described to be protected by Letters Patent is set forth in the appended claims:

[1. A method of producing a valve-equipped packaging container to be filled with a commodity, comprising the steps of forming a bag from a flexible sheet material; sealing a bottom of the bag; forming a hole on one of the surfaces of the bag; applying to said one surface in the area of said hole two members in superimposed relation to form a valve, one of said members contacting said one surface and being preliminarily provided with an opening and having a lower surface coated with an adhesive material so as to form two substantially parallel layers surrounding said opening which becomes in registry with said hole upon applying said two members, said two layers forming a valve channel between said one member and said one surface; pressing said members to said one surface to firmly connect the valve to the bag; filling the bag with the commodity and sealingly closing the bag; and applying a non-curing sealing fluid to free ends of said channel to produce a fluid film in said channel, said film being adapted to be ruptured by expanding gases which may develop in the closed bag, so as to enable said gases to escape from said bag and to thereafter inherently reseal.]

[2. The method of claim 1, wherein said fluid is applied to said valve by means of brush.]

[3. The method of claim 1, wherein said fluid is applied to said valve by means of twisted cord.]

[4. The method of claim 1, wherein said fluid is applied to said valve by means of drops.]

[5. The method of claim 1, wherein said fluid is injected in said valve through a nozzle.]

[6. The method of claim 1, wherein said fluid is a silicone oil.]

[7. A method of sealing a valve attached to a surface of a packaging container which valve includes two superimposed members one of which is attached to the container and having an opening communicating with the interior of the container and a second one being formed of a flexible material, said valve when attached to said surface forming a valve channel between said one member and said surface; the method comprising the step of applying a non-curing sealing fluid to at least one end of said channel to produce a fluid film in said channel, whereby, said flexible member may be lifted by expanded gases which may occur in the closed container and said film may be broken to enable said gases to escape from said container and thereafter inherently reseal.]

*8. A method of sealing a valve attached to a surface of a packaging container which valve includes two superimposed members one of which is attached to the container and having an opening communicating with the interior of the container and a second one being formed of a flexible material, said members when attached to each other forming a valve channel therebetween, the method comprising the step of applying a non-curing sealing fluid to at least one end of said channel to produce a fluid film in said channel, whereby, said flexible member may be lifted by expanded gases which may occur in the closed container and said film may be broken to enable said gases to escape from said container and thereafter inherently reseal.*

*9. The method of claim 8, wherein said fluid is applied to said valve by means of brush.*

*10. The method of claim 8, wherein said fluid is applied to said valve by means of twisted cord.*

*11. The method of claim 8, wherein said fluid is applied to said valve by means of drops.*

*12. The method of claim 8, wherein said fluid is injected in said valve through a nozzle.*

*13. The method of claim 8, wherein said fluid is a silicone oil.*

* * * * *